(12) United States Patent  
Moon et al.

(10) Patent No.: US 10,597,163 B2  
(45) Date of Patent: Mar. 24, 2020

(54) AIR FREIGHT TEMPERATURE CONTROLLED DEVICE USING LIQUID NITROGEN

(71) Applicants: William G Moon, Provo, UT (US); John J Hammerman, Bozeman, MT (US)

(72) Inventors: William G Moon, Provo, UT (US); John J Hammerman, Bozeman, MT (US)

(73) Assignee: Reflect Scientific Inc., Provo, UT (US)

( * ) Notice: Subject to any disclaimer, the term of this patent is extended or adjusted under 35 U.S.C. 154(b) by 0 days.

(21) Appl. No.: 16/406,965

(22) Filed: May 8, 2019

(65) Prior Publication Data

US 2019/0322374 A1 Oct. 24, 2019

Related U.S. Application Data

(63) Continuation-in-part of application No. 15/893,487, filed on Feb. 9, 2018, now abandoned.

(51) Int. Cl.
| | | |
|---|---|---|
| *B64D 13/08* | (2006.01) | |
| *F17C 9/00* | (2006.01) | |
| *B64D 13/06* | (2006.01) | |

(52) U.S. Cl.
CPC ............ *B64D 13/08* (2013.01); *F17C 9/00* (2013.01); *B64D 2013/0648* (2013.01); *F17C 2205/0329* (2013.01); *F17C 2205/0335* (2013.01); *F17C 2205/0394* (2013.01); *F17C 2221/014* (2013.01); *F17C 2270/0189* (2013.01)

(58) Field of Classification Search
CPC ... B64D 13/08; B64D 2013/0648; F17C 9/00; F25D 3/10; F25D 3/107
See application file for complete search history.

(56) References Cited

U.S. PATENT DOCUMENTS

| | | | | |
|---|---|---|---|---|
| 3,854,620 A | * | 12/1974 | Saidla | B29D 22/00 220/616 |
| 5,337,579 A | * | 8/1994 | Saia, III | B60H 1/3226 62/239 |
| 6,758,057 B2 | * | 7/2004 | Vince, II | B60H 1/00014 62/239 |

(Continued)

FOREIGN PATENT DOCUMENTS

| | | | |
|---|---|---|---|
| JP | H09120916 A | * | 5/1997 |
| JP | 2003148808 A | * | 5/2003 |

OTHER PUBLICATIONS

Higashida, Mounting Structure of Tank, May 21, 2003, JP2003148808A, Whole Document (Year: 2003).*

(Continued)

*Primary Examiner* — Larry L Furdge  
(74) *Attorney, Agent, or Firm* — Tran & Associates

(57) ABSTRACT

Systems and methods are disclosed for transporting products with an airplane by controlling temperature in a payload bay using cryogenic coolant and a heat exchanger to cool the payload bay and heat from a heater; recycling exhaust from the heat exchanger to power a Stirling engine; charging a storage device with power from the Stirling engine; housing the payload bay as part of a modular, stackable module in an aircraft bay for transportation; and venting exhaust gas to an exterior of the airplane.

20 Claims, 17 Drawing Sheets

(56) References Cited

U.S. PATENT DOCUMENTS

| | | | | |
|---|---|---|---|---|
| 8,336,329 | B2* | 12/2012 | Uluc | B64D 13/00 |
| | | | | 62/407 |
| 2009/0176135 | A1* | 7/2009 | Saito | B60L 1/00 |
| | | | | 429/422 |
| 2013/0055728 | A1* | 3/2013 | Lurken | B60H 1/3202 |
| | | | | 62/7 |
| 2013/0086933 | A1* | 4/2013 | Holtkamp | F25D 29/00 |
| | | | | 62/129 |
| 2015/0330679 | A1* | 11/2015 | Bowdish | B60H 1/00014 |
| | | | | 62/239 |
| 2016/0025339 | A1* | 1/2016 | Kamath | B64D 37/30 |
| | | | | 60/782 |
| 2017/0234583 | A1* | 8/2017 | Moon | F25D 3/105 |
| | | | | 62/50.2 |
| 2017/0349262 | A1* | 12/2017 | Brown | B64C 1/18 |

OTHER PUBLICATIONS

Muramatsu et al., Gas Cooled Stationary Induction Machine, May 6, 1997, JPH09120916A, Whole Document (Year: 1994).*

* cited by examiner

AIR FREIGHT TEMPERATURE CONTROLLED DEVICE USING LIQUID NITROGEN

This application is a continuation in part of U.S. application Ser. No. 15/893,487, the content of which is incorporated by reference.

FIELD OF SYSTEM

The present invention relates to temperature-controlled air freight type unit load devices (ULD).

BACKGROUND OF THE SYSTEM

The airline industry has been using Unit Load Devices (ULD) for decades. It allows a large quantity of cargo to be bundled into a single unit, saving ground crews time and effort. However, these units typically are not temperature controlled. Perishable items such as fruits and vegetables, fresh meats and fish, flowers, and plants typically will be damaged in flight without a temperature-controlled environment. The current temperature controlled ULDs require the inconvenience of replacing ice or dry ice, or being plugged into a power box for 6 hours per recharge.

SUMMARY

In one aspect, systems and methods are disclosed for transporting products with an airplane by controlling the temperature in a ULD payload bay using cryogenic coolant and a heat exchanger to cool, and an electrical power source and heating element to heat the ULD payload bay; and providing electrical power to a storage device by means of a gas turbine generator and a Stirling engine; and housing the payload bay as part of a modular, stackable module in an aircraft bay for transportation.

Implementations of the above aspect may include one or more of the following: The system is powered by liquid nitrogen which heats or cools the payload bay as required to maintain a constant temperature for the customer's product. Vacuum Insulated Panels (VIPs) thermally isolate the payload bay from the harsh, rapid, and extreme temperature changes typically experienced in airline cargo areas. The system is autonomous and can operate without additional power for up to 10 days. Refueling is accomplished with a cryogenic bulk tank or service truck. Sensors are deployed to report temperature to a remote computer for monitoring the temperature of the payload and shock encountered throughout the shipping duration, among others.

In another aspect, cryogenic tanks are connected in parallel to a heat exchanger and a Stirling engine. Two solenoid valves determine the flow of liquid nitrogen through the heat exchanger for cooling and the Stirling engine for electric power. The solenoid valves are energized and opened by the controller and operate independently when there is a demand for cooling or a demand for recharging the deep cycle batteries. An additional source of electrical power is provided by a gas turbine generator that is powered by the exhaust from both the heat exchanger and the Stirling engine. A thermal sensor inside the payload bay communicates the current temperature to the controller. An electric heating element is placed in the same airflow path as the heat exchanger. A fan blows air through both the the heat exchanger for cooling and the electric heating element for heating. Storage devices such as deep cycle batteries are charged by a Stirling engine generator and a gas turbine generator to provide power for the electric heating element, fan, control electronics, data storage and telemetry. The ULD has an exhaust port and the exhaust nitrogen gas is vented outside the ULD. The gas may be vented directly into the cargo area or a hose may be used to vent the gas to a quick connect port that vents to the outside of the airplane.

In another aspect, when liquid nitrogen is prohibited during flight, the ULD can be precooled or preheated before takeoff. During flight, liquid nitrogen will not be stored, used, or exhausted by the ULD. The ULD will still maintain the setpoint, within a few degrees, without the use of coolant. This method of operation is referred to as "Passive Shipping". Prior to flight the ULD is connected to a cryogenic bulk tank or service truck for coolant and to an electrical power source, such as a generator or AC outlet to recharge the deep cycle batteries and also supply power to the heating element when there is a demand for heat. The ULD is then operated in a cooling or heating capacity until the predetermined shipping setpoint is attained. The coolant and power are disconnected and the ULD is loaded into the cargo area of the airplane with no liquid nitrogen in the ULD cryogenic tanks. During flight, the ULD will maintain the setpoint temperature within a few degrees, because the ULD is extremely well insulated with state-of-the art Vacuum Insulated Panels that significantly reduces heat flow into or out of the ULD. When there is a demand for heat during Passive Shipping, the deep cycle batteries power the electric heating element. Without liquid nitrogen as a power source, the Stirling engine and gas turbine generator do not operate. Therefore the heating capability in Passive Shipping mode will be less than normal, but sufficient, to maintain the predetermined setpoint temperature to within a few degrees. After landing the ULD is again connected to a coolant and power source wherein cooling or heating resumes to bring the ULD exactly to the predetermined setpoint temperature. The cryogenic tanks in the ULD may also be refilled at this time for autonomous operation during transport to the final destination.

In another aspect, when the airline company not only restricts the use of liquid nitrogen but also restricts empty cryogenic tanks during flight, then the cryogenic tanks are removed from the ULD.

In another aspect, an alternative method of cooling is known as Direct Inject. The liquid nitrogen is sprayed into the payload bay. The design eliminates the heat exchanger and utilizes a tube with a multiplicity of nozzles. When there is a demand for cooling, the solenoid valve is energized, and the liquid nitrogen flows from the cryogenic tanks, through the solenoid valve, through the tube, and sprays through the nozzles and into the payload bay. The liquid nitrogen evaporates and provides extremely efficient cooling. The evaporated nitrogen gas increases the pressure of the payload bay, forcing the exhaust nitrogen gas through a vent pipe. But since the air in the cargo area of the airplane is continuously recycled with external air, oxygen depletion is not a significant concern. In certain aircraft, there may be a quick connect port that vents outside the airplane. The ULD vent hose is attached to that port, and the exhaust nitrogen vents outside the airplane, further reducing oxygen depletion concerns. The advantages of Direct Inject are faster and more efficient cooling. The disadvantages are extremely cold spots on product near the cryogenic spray and non-uniform distribution of cooling throughout the payload bay.

In another aspect, a blowout panel is attached to the ULD. The blowout panel consists of a hollow box approximately 2 feet square, wherein the exterior side of the blowout panel is exposed to the interior environment of the aircraft. The interior side of the blowout panel consists of two parts, one of which is an unmoving frame while the other is a panel that is attached to guide poles. The panel fits within the unmoving frame in such a way as to make the two parts airtight. Springs around the guide poles provide force so as to keep the panel sealed against the unmoving frame. The blowout panel is made of stainless steel and filled with a Vacuum Insulated Panel, making it thermally equivalent with the typical surface of the ULD. In the unlikely event of a pressure drop inside the airplane, the blowout panel will experience a force arising from the pressure difference between the interior of the ULD and the interior of the aircraft. This pressure difference will create a force against the blowout panel, greater and opposite to that of the springs. This force will cause the panel to push away from the unmoving frame, allowing the interior pressure of the ULD to rapidly equalize with the interior pressure of the aircraft. In the event of decompression of the aircraft, the air inside the cargo area may drop as much as 10 PSI in one second. This large instantaneous pressure drop equates to 1,440 pounds per square foot, and this pressure difference between the air outside and inside the ULD can cause the ULD to behave like a bomb and explode. However, the blowout panel counteracts this by rapidly equalizing the pressures within and without the ULD, effectively eliminating the risk of the ULD exploding. After decompression is complete, the blowout panel will return to its closed and sealed state, thus allowing for normal operation to recommence without significant temperature losses from the decompression.

In another aspect, one or more load cells are placed such that they support the weight of the liquid nitrogen tanks. Blocks are welded above and below the load cells to limit the load cell travel during high shock landings and takeoffs. The load cells enable the accurate reading of the volume of liquid nitrogen in liquid nitrogen tanks.

In another aspect, one or more LN2 tanks are positioned within the ULD in a horizontal fashion. The ULD payload bay geometrical configuration doesn't allow for LN2 tanks to be placed vertically within, thus horizontally placed tanks are required. Due to the horizontal configuration of the LN2 tanks, the liquid nitrogen within may move around in such a way as to expose gaseous nitrogen to the liquid nitrogen outlet. Baffles are placed within the LN2 tank to partially restrict liquid flow and maintain liquid nitrogen around the liquid nitrogen outlet.

In another aspect, large fans and large heat exchangers are positioned within the ULD such that a large surface area of the heat exchanger is exposed to the payload bay and the fans draw air flow through the heat exchanger and into the payload bay. The rapid cooling of products is sometimes necessary, especially when the ULD will not be actively cooling during a large portion of time with product within it, such as when the aircraft it is on is in flight. The large heat exchangers allow for a large surface area to be exposed to the payload bay atmosphere. Cooling of the payload bay occurs through conduction, or the transfer of thermal energy from one substance to another by direct contact. The large surface area allows for more conduction to occur, or in other words for quicker cooling to occur. The large fans create air flow through the heat exchangers, causing convection to occur. Convection is conduction with added air flow, and is typically much more effective at transferring heat than conduction alone. The combination of large fans and large heat exchangers allow for extremely fast cooling of the payload bay. This enables the ULD to rapidly freeze or cool product prior to transport, without having to freeze or cool product during transit.

In another aspect, fiberglass beams are used in place of steel or similar beams to provide structural support. Fiberglass is much lighter compared to steel or similar beams. This is important for air transport because the weight of an object being transported directly influences how much money it costs to transport it, much more so than other methods of transportation. The fiberglass beams also act as thermal breaks, stopping the transfer of heat from the interior of the aircraft to the payload bay of the ULD. While fiberglass isn't as insulating as vacuum-insulated paneling, it is much more insulated then steel or comparable materials. Thus, fiberglass is the best material with consideration being given for cost, insulation properties, and specific weight.

In another aspect, safety valves are designed with several components whose purposes are to prevent the valves from failing in the open condition. Within an LN2 tank, the nitrogen will slowly warm up within. This increase in thermal temperature will cause a larger percentage of the nitrogen mass to be in the gaseous phase, which has a much higher specific volume than liquid nitrogen. When some of the liquid nitrogen within the tank phase changes to a gas, it will increase the pressure of the contents. This will increase indefinitely without further measures being taken. A safety valve is a component that maintains the pressure of a tank below a certain value. An LN2 tank with a safety valve will cycle through a pressure lower than the pressure of the safety valve, steadily increase to a pressure above that of the safety valve, and then drop as LN2 is vented from the tank through the safety valve. If this venting process takes a relatively long time, the venting LN2 will freeze any water vapor near the safety valve, causing the safety valve to freeze in an open position. This safety valve failure would cause all the LN2 within the LN2 to eventually evaporate and exit through the failed safety valve into the ULD, causing a potentially hazardous environment. The resulting drop in pressure of the LN2 tank would also render the cooling system inefficient. The safety valves are designed to have an extended length of copper tubing between the tank and safety valve. This tubing will enable to LN2 to warm up for a longer time before reaching the safety valve, maintaining a warmer safety valve. The copper tubing may have cooling fins along its length to aid in further warming up of the LN2 flowing through the tubing. An electrical heater is also attached to the safety valve, close to the valve's moving parts. This prevents the safety valve from freezing and sticking in the open position.

In another aspect, the ULD is equipped with a GPS tracker to enable constant remote tracking and a wireless datalogger to enable remote datalogging. Some types of highly valuable biomedical products require stringent environmental controls to maintain a high level of quality. It is highly desirable that when transporting such materials there is a means to track and monitor it. The GPS tracker and wireless datalogger enables this.

Advantages of the temperature controlled ULD invention may include one or more of the following: The system provides a temperature controlled environment to protect perishable products throughout the duration of airline flights and longer. The system provides cooling or heating for a large ULD and can maintain a constant internal temperature in the cargo area temperature environment that ranges from 50 deg C. on runways to −40 deg C. at flight altitudes. The ULD only requires a refill of liquid nitrogen once a week, which takes about 15 minutes. The system is easy to use, and the liquid nitrogen can be filled by the normal procedure used to fill cryogenic tanks in the field. There are no 6 hour power hookups or replacing ice or dry ice.

DETAILED DESCRIPTION

Figure 1:
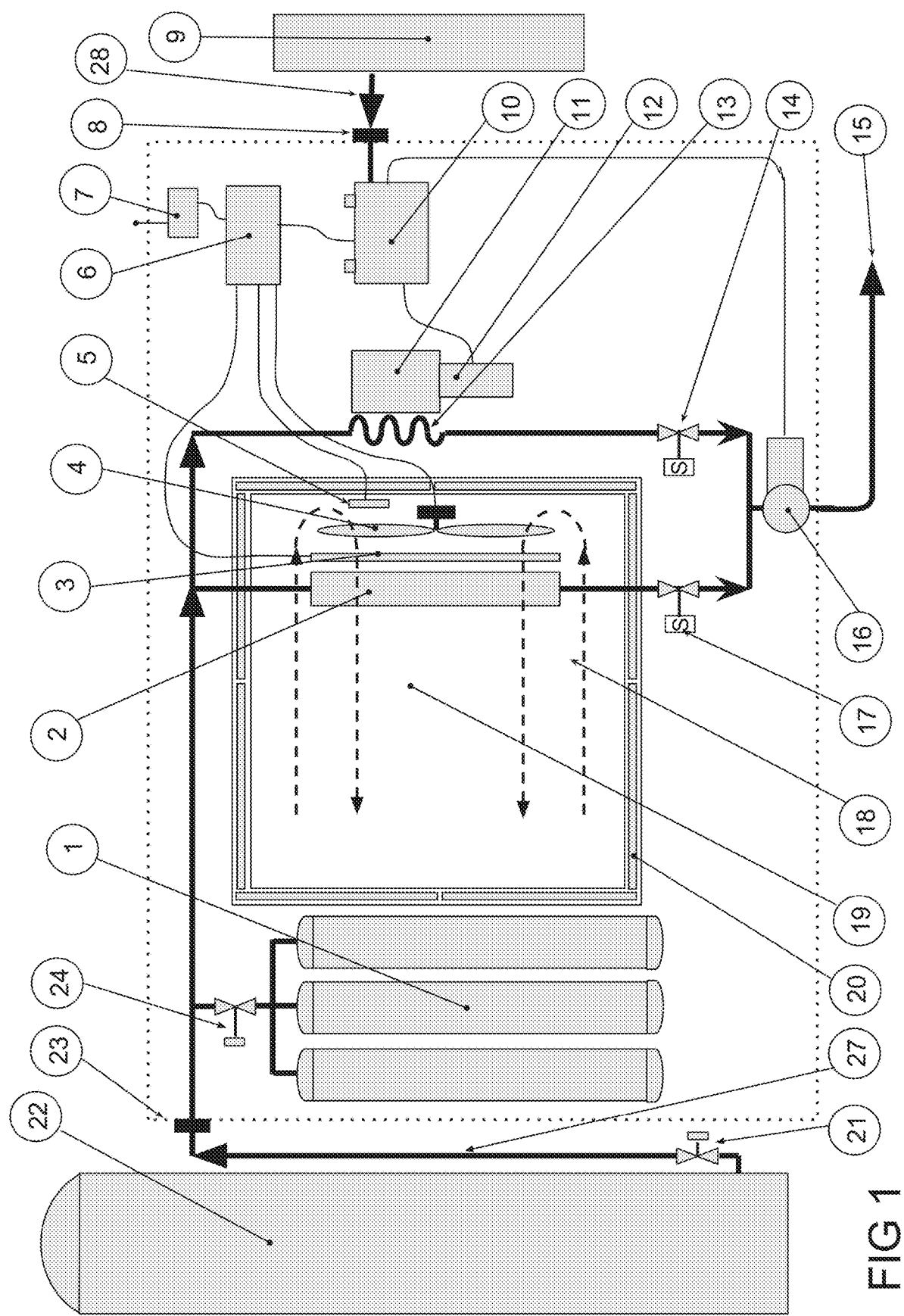
FIG. 1 is a piping and instrument diagram of the ULD in a refueling and recharging state connected to a cryogenic bulk storage tank and a portable generator
Figure 2:
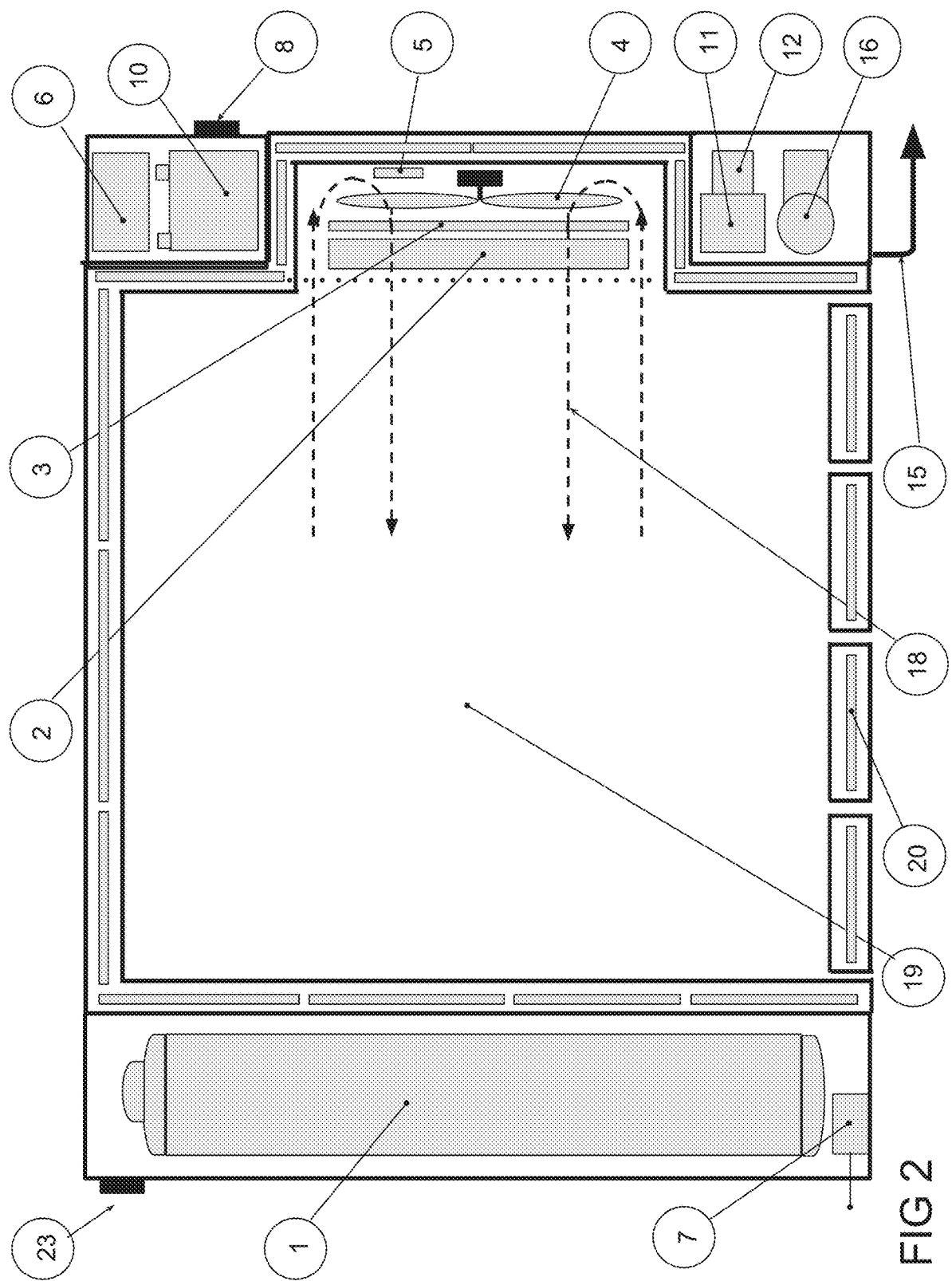
FIG. 2 is an exemplary cross section view of the top of the ULD.
Figure 3:
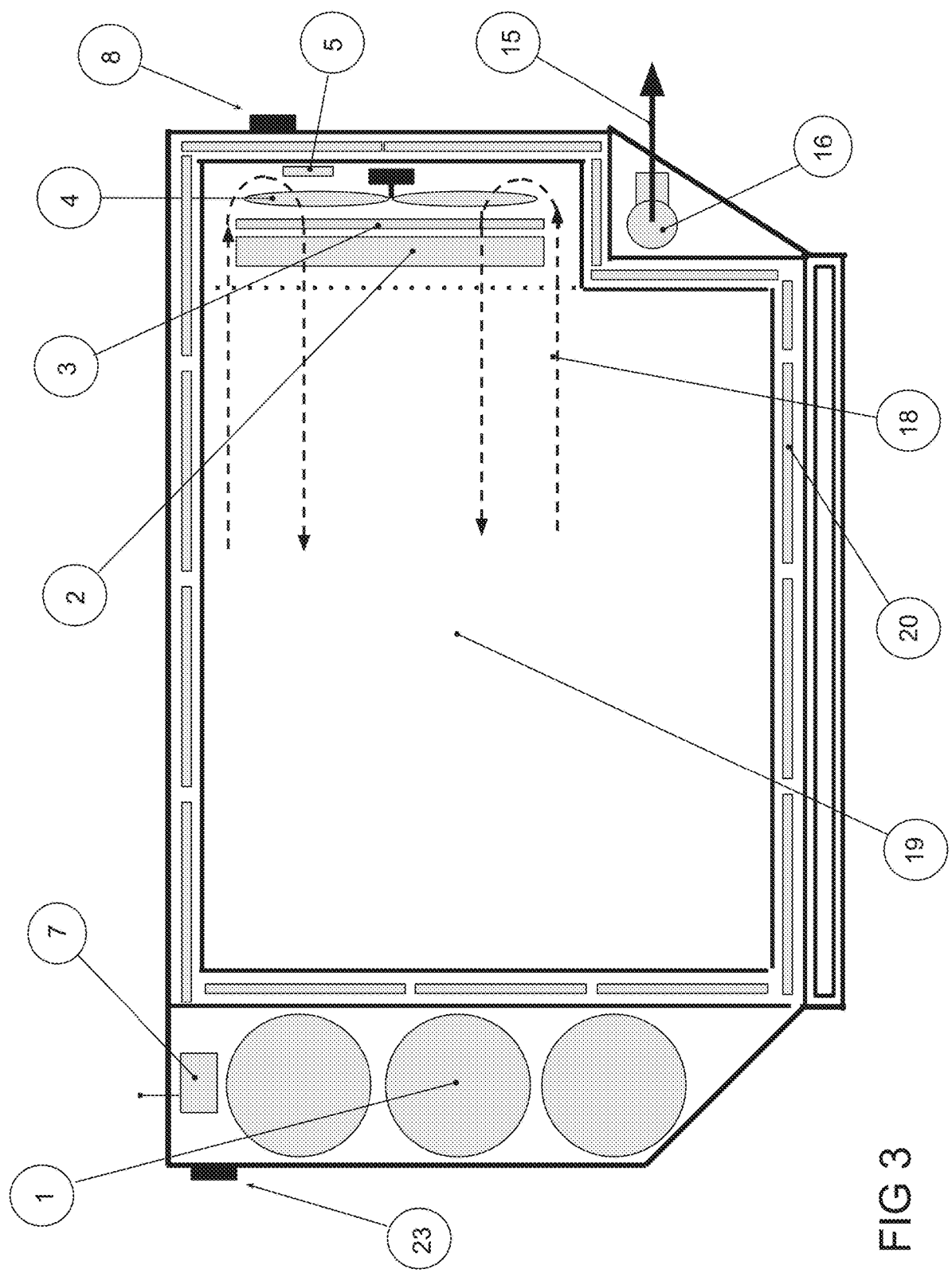
FIG. 3 is an exemplary cross section view of the side of the ULD.
Figure 4:
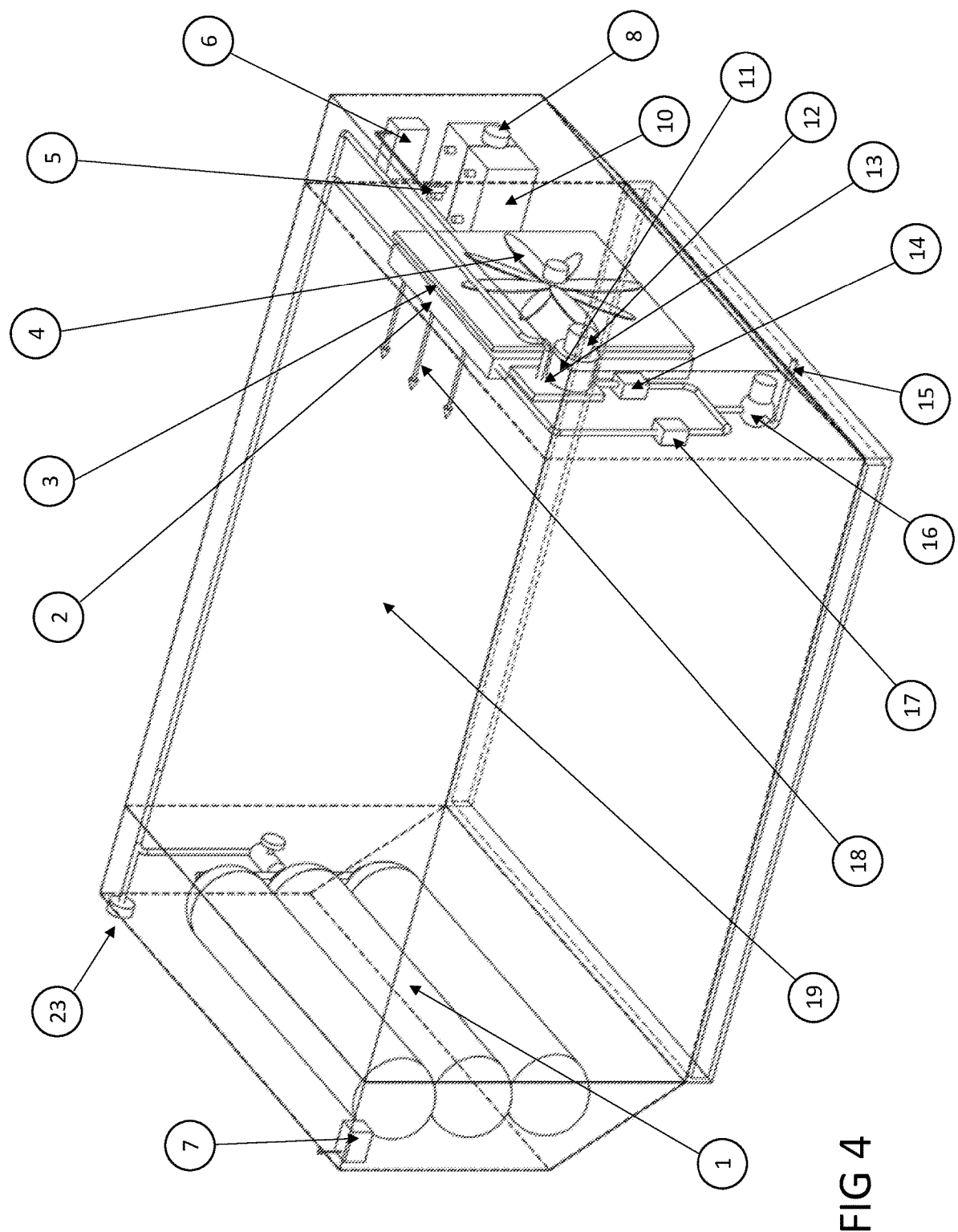
FIG. 4 shows a perspective view of the ULD.

Turning now to the figures, in one embodiment, FIGS. 1,2,3 & 4 show details of an air freight temperature controlled unit load device (ULD). In general, the ULD has a plurality of cryogenic tanks 1 connected to each other in a parallel type orientation, a shut off valve 24 and a tube connecting the cryogenic tanks to a heat exchanger 2. When there is a call for cooling from a controller 6, a solenoid valve 17 opens the flow of liquid nitrogen from the cryogenic tanks 1 through the heat exchanger 2. The unit also has a Stirling engine 11 to regeneratively charge power storage devices such as deep cycle batteries 10 that provide electrical power to the ULD. A tube connects the cryogenic tanks to a Stirling engine cold sink 13, and a solenoid valve 14 is connected to the Stirling engine plumbing that opens the liquid nitrogen flow through the Stirling engine cold sink 13 when there is a call to recharge deep cycle batteries 10 that supply power to the ULD. A gas turbine generator 16 operates whenever there is gas flow, and contributes power to recharge deep cycle batteries 10. An electric heating element 3 is powered by deep cycle batteries 10. When there is a demand for heat an electric heating element 3 is energized by controller 6. A fan 4 positioned inside a payload bay 19 is powered by deep cycle batteries 10, for uniform convective heating and cooling. A controller 6 in conjunction with a thermal sensor 5 in a payload bay 19 for temperature feedback, controls solenoid valves 14 & 17 to adjust the temperature to a predetermined setpoint in a payload bay 19. A payload bay 19 is isolated from the cargo environment with a double wall and Vacuum Insulated Panels 20 placed between the walls. An exhaust hose 15 vents the ULD to the cargo area or to a quick connect port that vents outside the airplane. The unit can have an operational data recorder and transmitter 7 to log temperature as well as damages arising from dropping the ULD, for example.

Figure 5:
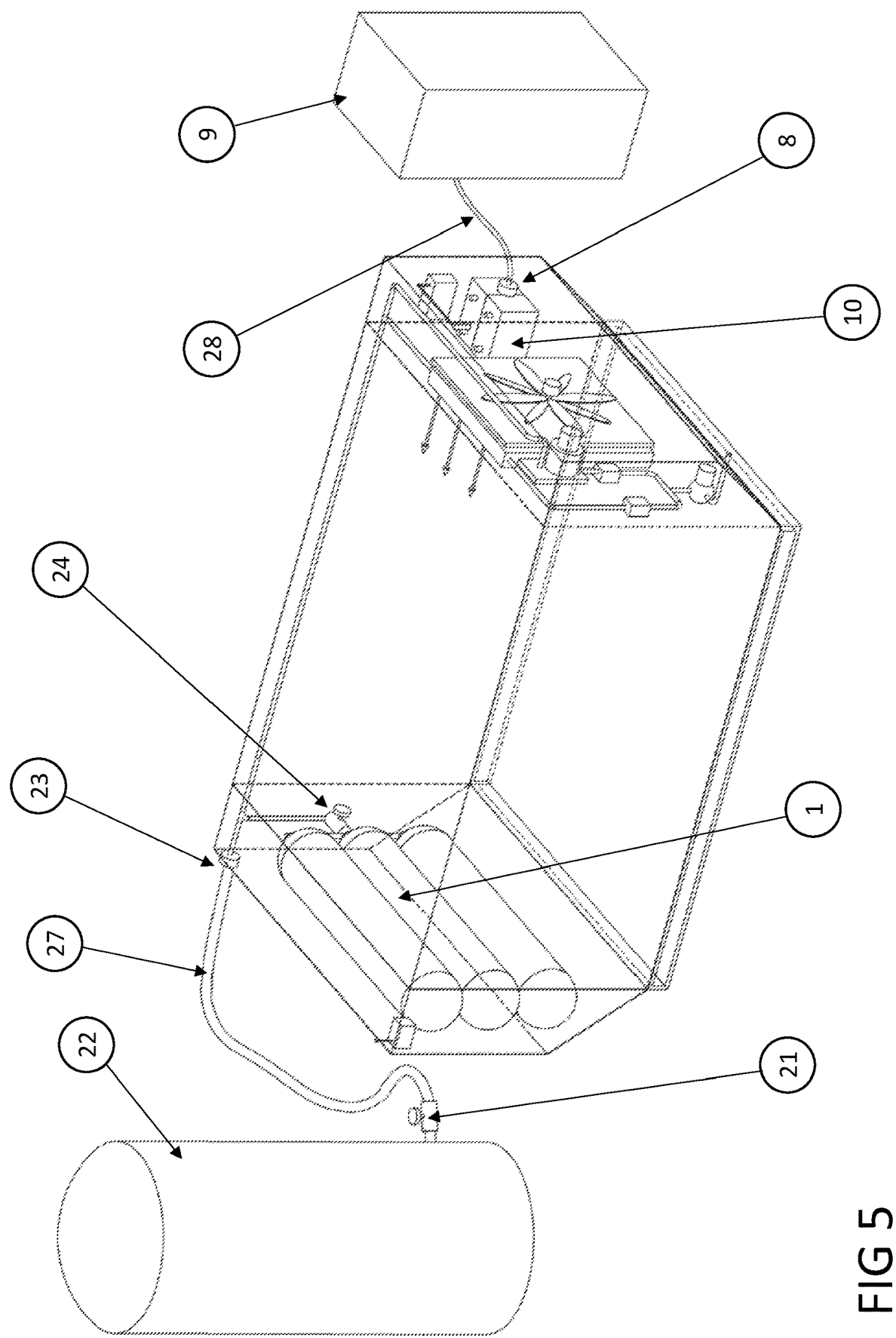
FIG. 5 shows a perspective view of the ULD during refueling and recharging.

FIG. 5 shows one embodiment of the ULD during refueling and recharging. The ULD is refueled and recharged outside the aircraft and has quick connects for both the coolant 23 and the electrical power 8. The ULD is moved to a cryogenic bulk tank 22 and generator 9 location at the airport. Cryogenic bulk tanks can hold 30,000 gallons of liquid nitrogen and provide coolant for many ULD's on numerous flights. A cryogenic bulk tank 22 is attached to the quick connect 23 with hose 27. Valve 21 opens and liquid nitrogen fills the onboard cryogenic tanks 1. The quick connect 23 houses a check valve to prevent coolant leakage when hose 27 is removed. A manual valve may serve the same purpose. Deep cycle batteries 10 are recharged from a generator 9. Both the cryogenic bulk tank 22 and the generator 9 are located in the same area of the airport and connected and operate at the same time. Both a Stirling engine 11 and a gas turbine generator 16 recharge deep cycle batteries 10 during normal flight operation. However, extended flights may require substantial heating. Thus, deep cycle batteries 10 may require additional energy that is supplied by generator 9. However the recharge time will typically be limited to the 15 minute coolant fill time, which will be sufficient for battery recharge in most cases.

In one embodiment, the liquid nitrogen temperature controlled device has the capability of cooling or heating the payload bay 19 and maintaining the predetermined setpoint temperature to within +/−2 deg C. in an air cargo compartment environment ranging from −40 to 50 deg C. for 10, 20, 30 or 90 days. Longer durations are possible with larger cryogenic tanks and deep cycle batteries.

In another embodiment, the controller 6 receives input from a thermal sensor 5, compares that temperature to a predetermined setpoint temperature and utilizes a Proportional Integral Derivative (PID) module that accurately maintains the payload bay 19 temperature.

In another embodiment, Operational data is recorded and stored in a data recorder and transmitter 7. Through telemetry a remote receiver monitors the operational data.

Cooling the payload bay 19 is accomplished as follows: When the payload bay 19 temperature is higher than the predetermined setpoint temperature, the controller 6 calls for cooling. The controller 6 communicates with and opens solenoid valve 17, which causes liquid nitrogen to flow from the cryogenic tanks 1 into and through the heat exchanger 2. The liquid nitrogen temperature as it enters the heat exchanger 2 is approximately −196 deg C., immediately providing substantial cooling in the heat exchanger 2. A fan 4 moves the air 18 through the heat exchanger 2 and throughout the payload bay 19 to ensure the customer product receives ample and uniform cooling by convection.

Heating the payload bay 19 is accomplished as follows: When the payload bay 19 temperature is colder than the predetermined setpoint, the controller 6 calls for heat. The controller 6 communicates with and energizes the electric heating element 3. The fan 4 moves the air 18 through the electric heating element 3 and throughout the payload bay 19 to ensure the customer product receives ample and uniform heating by convection.

Power is derived from the Stirling engine 11 as follows: The controller 6 detects the deep cycle battery voltage is below a preset threshold and opens solenoid valve 14 causing liquid nitrogen to flow from the cryogenic tanks 1 through the Stirling engine cold sink 13. The efficiency and power of a Stirling engine 11 is determined mainly by the temperature difference between the cold sink and the heat sink. Since the liquid nitrogen temperature entering the cold sink 13 is approximately −196 deg C. and the ambient temperature, the hot sink, is always warmer than −40 deg C., the temperature difference between the cold sink and the hot sink will always be greater than 156 deg C., thus providing the Stirling engine 12 sufficient energy to rotate a generator 12 that is connected directly to a Stirling engine 11. Generator 12 then recharges deep cycle batteries 7.

Power is derived from the gas turbine generator 16 as follows: When there is liquid nitrogen flowing from the cryogenic tanks 1 through the heat exchanger 2, or the Stirling engine cold sink 13, or both 2 & 13, the nitrogen gas evaporates as it absorbs heat and expands to 700 times the original liquid volume. Gas expansion is ideal for powering the gas turbine generator 16. Whenever there is a demand for cooling or a demand for operating the Stirling engine, expanded nitrogen gas flows through the gas turbine generator 16 and it delivers energy to recharge deep cycle batteries 10.

The payload bay 19 has double walls. Vacuum Insulated Panels (VIPs) 20 are placed between the walls to substantially reduce payload bay 19 thermal losses.

The payload bay 19 is box shaped with 4 doors for easy access to the contents of the payload bay. The entire thermal system is located in the two opposing sides of the ULD shown in FIG. 4, providing the unencumbered box shape compartment for ease of loading and unloading.

FIG. 5 shows the ULD during refueling and recharging. When "Active Shipping" is required, meaning the cryogenic tanks 1 inside the ULD contain liquid nitrogen and the ULD actively operates during transport, the cryogenic tanks 1 are filled prior to shipment from a cryogenic bulk tank 22 or service truck. Valve 21 controls the liquid nitrogen flow during the process of filling the cryogenic tanks 1. Supply line 27 is used to make the connection to the quick connect port 23 on the ULD. Also, the deep cycle batteries 10 are recharged with an electric source, such as an AC outlet or generator 9. This connection is made with a power line 28 at the quick connect port 8.

Figure 6:
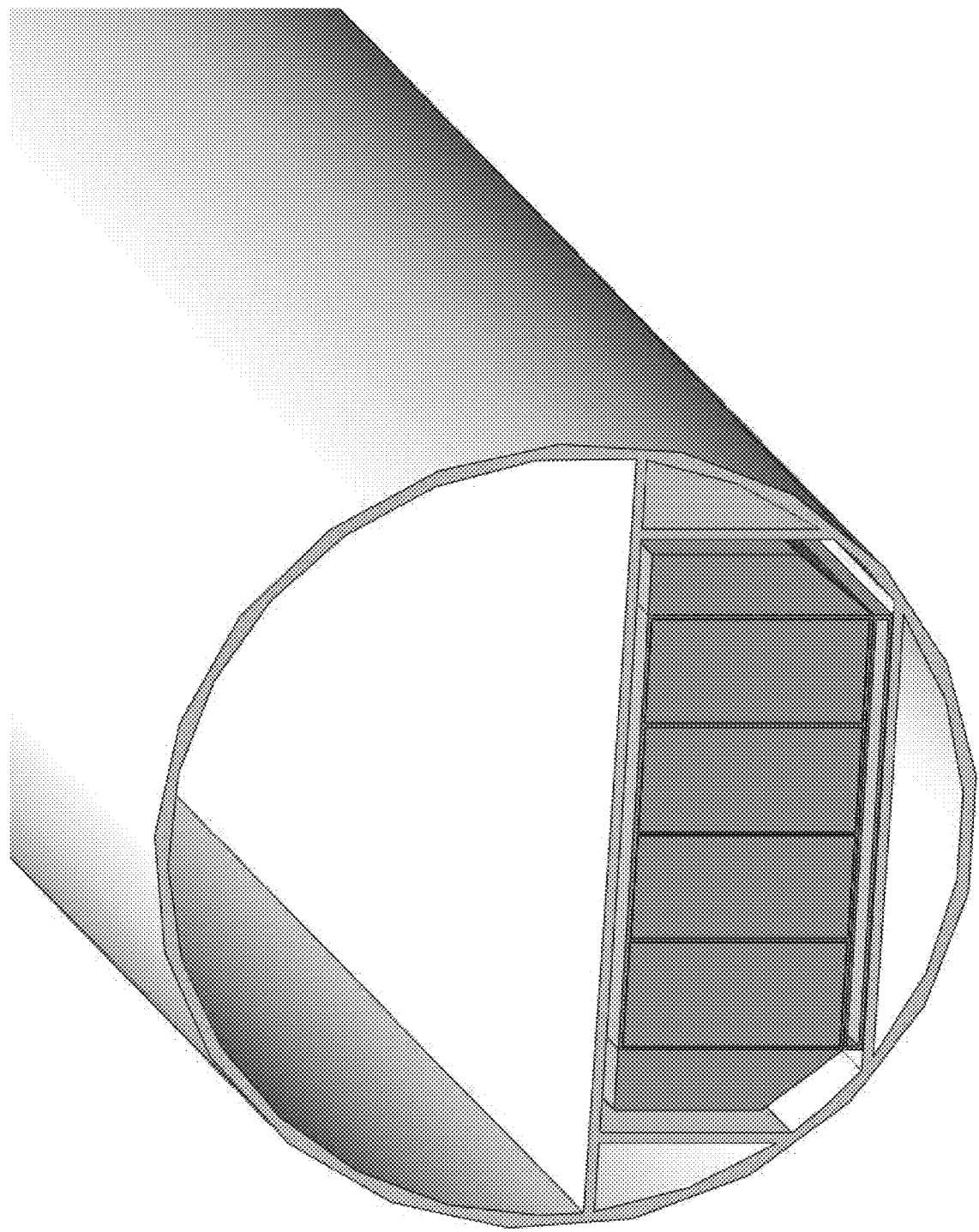
FIG. 6 shows a perspective view of the ULD in an aircraft.

FIG. 6 shows a perspective view of the ULD in an aircraft. Standard ULDs are configured to fit in the belly of the aircraft. The temperature controlled ULD has exactly the same exterior dimensions as a standard ULD and will fit into cargo spaces designed for standard ULDs.

Figure 7:
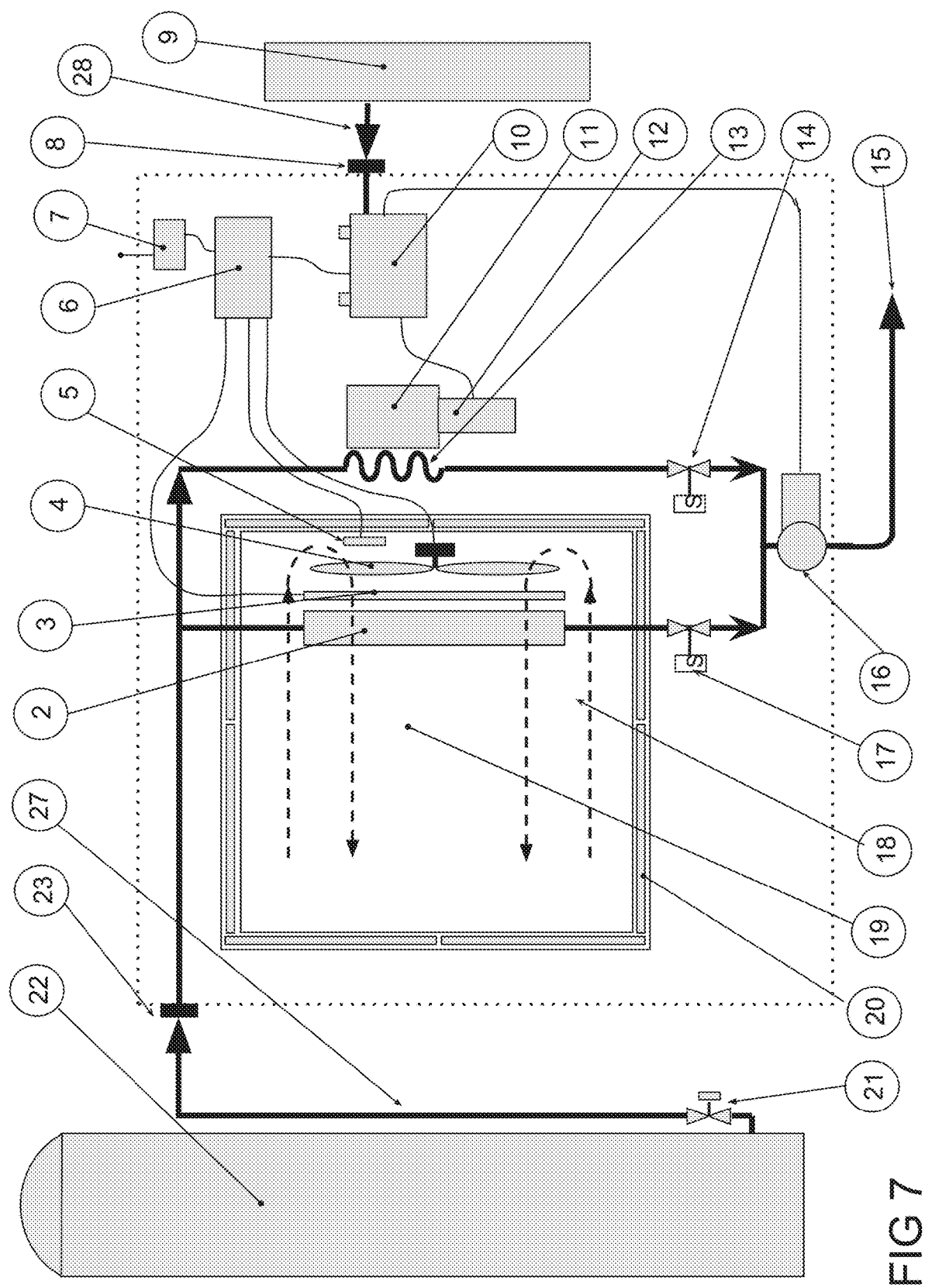
FIG. 7 shows a piping and instrument diagram of the Passive Shipping ULD in a pre-boarding state, connected to a cryogenic bulk tank and a portable generator.

FIG. 7 shows an embodiment of ULD designed for use when coolant is not permitted during transport. This design called Passive Shipping ensures that the cryogenic tanks 1 inside the ULD are either removed completely as shown in FIG. 7, or remain onboard and are closed with a shut off valve 24 as shown in FIG. 1 to prevent any liquid nitrogen from entering the cryogenic tanks. Before boarding, the ULD is connected to an external cryogenic storage tank 22 or a liquid nitrogen service truck, and the coolant supply line 27 is attached to a quick connect port 23 on the ULD that is piped directly to the input of the heat exchanger 2. The ULD temperature controller 6 is turned on and the ULD operates using the external cryogenic storage tank 22 as the coolant source. An AC outlet or generator 22 is attached to quick connect 8 and supplies power for the fans 4, controller 6, and telemetry 7. When the predetermined temperature setpoint has been reached, the ULD is ready for transport and the supply hose 27 and power line 28 are disconnected from the unit.

Figure 8:
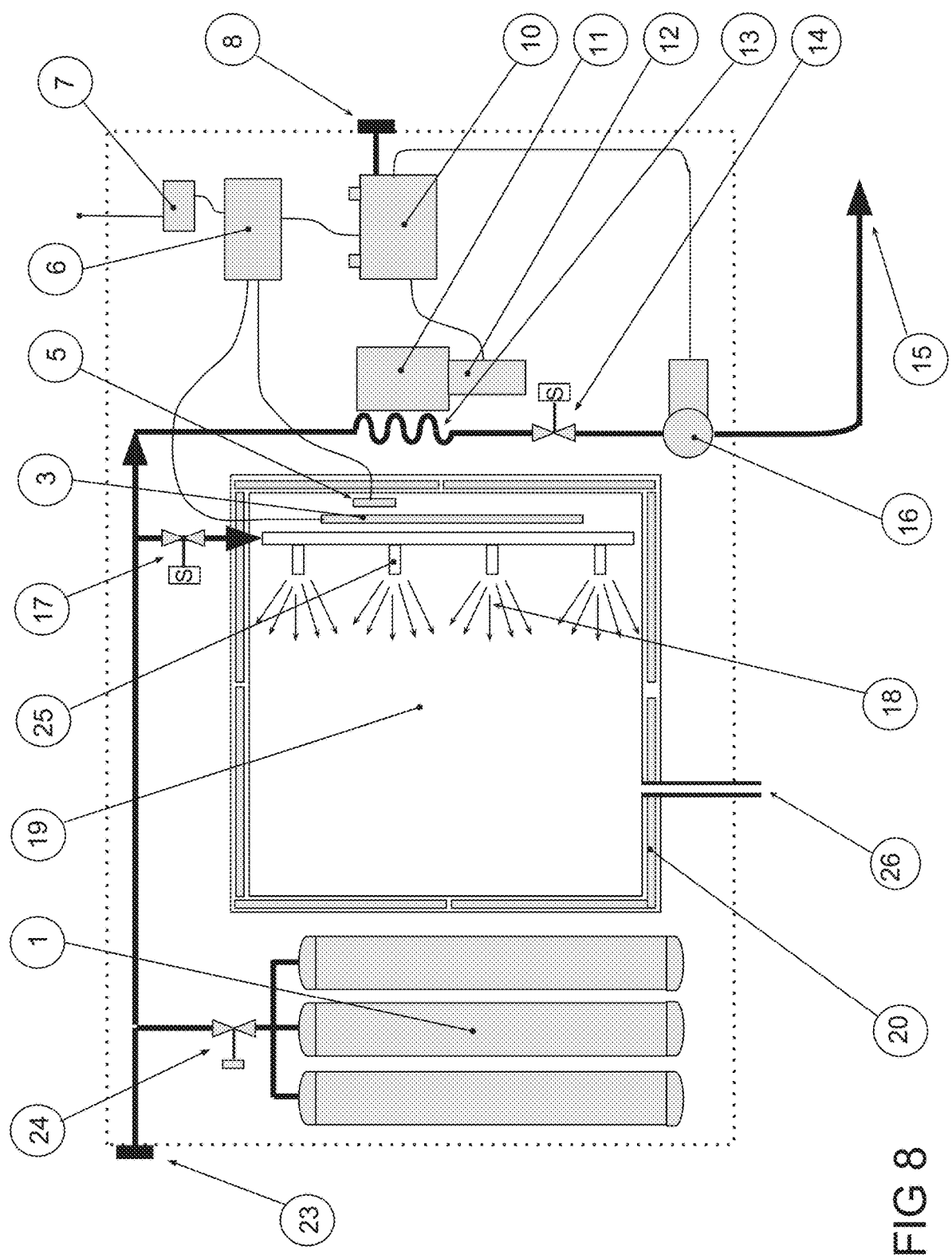
FIG. 8 shows a piping and instrument diagram of the Direct Inject ULD

FIG. 8 shows another embodiment of the invention, an alternative method of cooling known as Direct Inject. The liquid nitrogen is sprayed 18 into the payload bay 19. The design eliminates the heat exchanger 2 and utilizes a tube with a multiplicity of nozzles 25. When there is a demand for cooling, the solenoid valve 17 is energized, and the liquid nitrogen flows from the cryogenic tanks 1, through the solenoid valve 17, through the tube, through the nozzles 25 and sprays 18 into the payload bay. The liquid nitrogen evaporates and provides extremely efficient cooling. The evaporated nitrogen gas increases the pressure of the payload bay, forcing the exhaust nitrogen gas through a vent pipe 26. Vent pipe 26 may be connected to a hose that vents outside the airplane. When the deep cycle batteries 10 require recharging, the controller 6 opens solenoid valve 14 that causes nitrogen to flow through the Stirling engine cold sink 13 and the gas turbine generator 16. Both the Stirling engine generator 13 and the gas turbine generator 18 deliver power to the deep cycle batteries 10.

Figure 9:
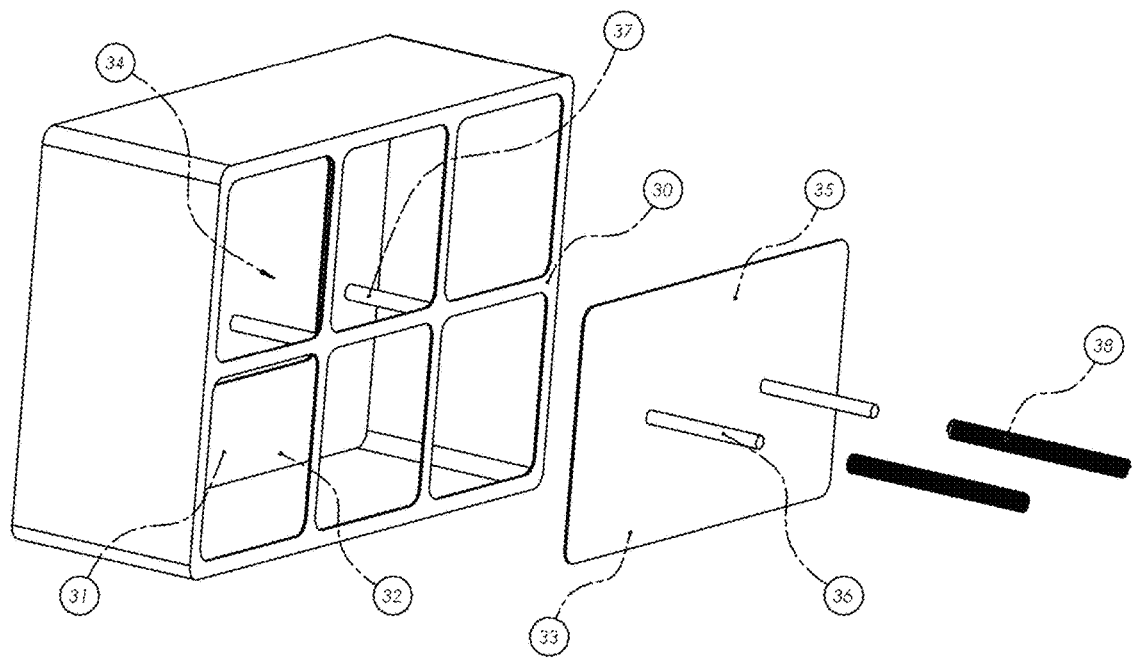
FIG. 9 shows an exemplary exploded view of the blowout panel.
Figure 10:
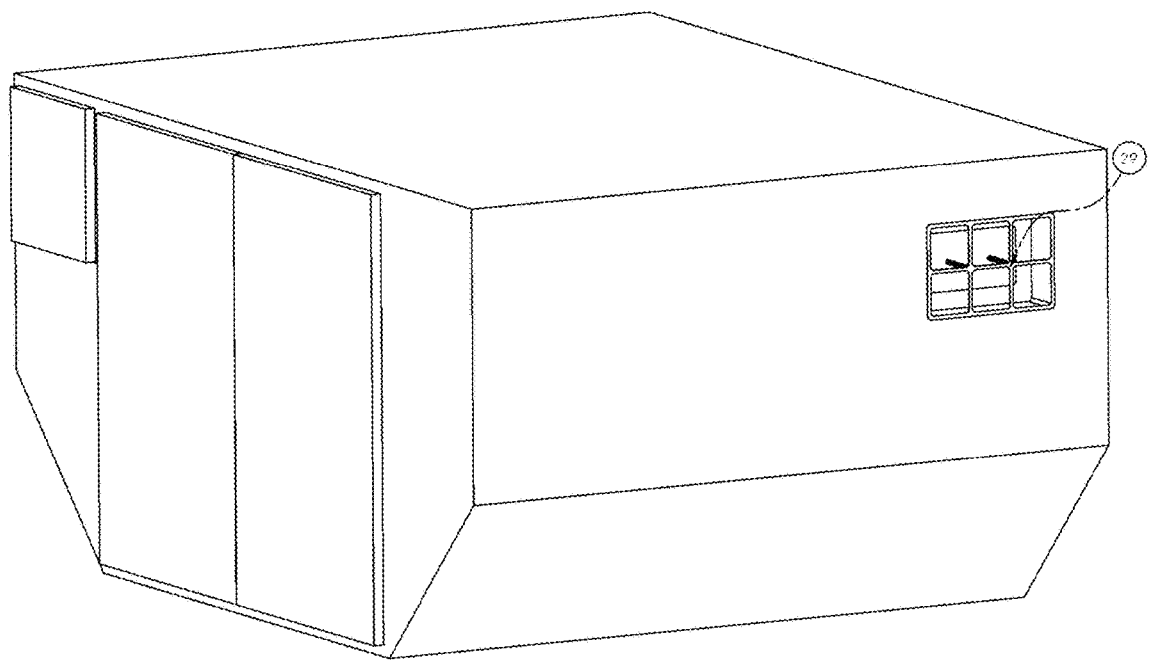
FIG. 10 shows an exemplary perspective view of the ULD with the blowout panel.
Figure 11:
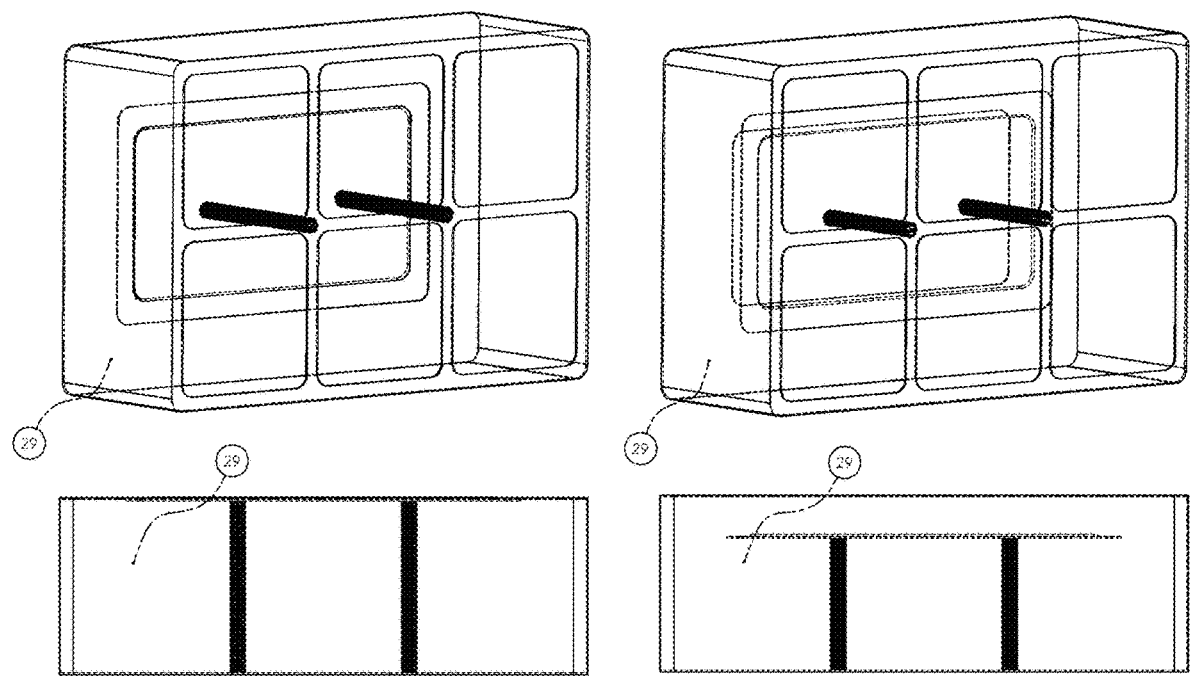
FIG. 11 shows exemplary perspective and top views of the blowout panel in both the open and closed position.

Now referring to FIG. 9-11, a blowout panel 29 is attached to the side of the ULD. The blowout panel 29 consists of an exterior side 30 and an interior side 31. The exterior side 30 faces the exterior of the ULD and is exposed to the exterior environment. The interior side 31 faces the payload bay 19 and is composed of a frame 32 and a sliding panel 33. The frame 32 is stationary and has a hole 34. The sliding panel 33, when pushed against the frame 32, seals the payload bay 19 from the exterior environment, and is composed of panel insulation 35. The sliding panel 33 has one or more guide poles 36 that fit within one or more guide rails 37 on the exterior side 30. One or more springs 38 fit over the guide rails 37 and guide poles 36.

In the event of an immediate depressurization of the aircraft interior, or the immediate exterior of the ULD, the pressure from the payload bay 19 suddenly becomes much higher than the pressure on the exterior of the ULD. The ULD is not designed as a pressure vessel and could behave like a bomb from the sudden pressure gradient, if not for the blowout panel 29. When the force resulting from the pressure within the payload bay 19 reaches past a certain level, the blowout panel 29 will immediately act as a pressure equalizer, eliminating any potential explosive behavior from the ULD.

The one or more springs 38 that fit over the guide rails 37 and guide poles 36 provide a spring force by pushing against the exterior side 30 and the sliding panel 33. Since the exterior side 30 is part of the frame 32 and does not move, the sliding panel 33 is pushed firmly against the hole 34. In the event of a depressurization of the immediate exterior of the ULD, the pressure within the payload bay 19 becomes greater than that of the pressure without the payload bay 19. The resulting force will overpower the spring force from the one or more springs 38 and push the sliding panel 33 along the guide poles 36 and create a substantial pathway for air to escape the payload bay 19, allowing for the rapid pressure equalization from within and without the payload bay 19.

Figure 12:
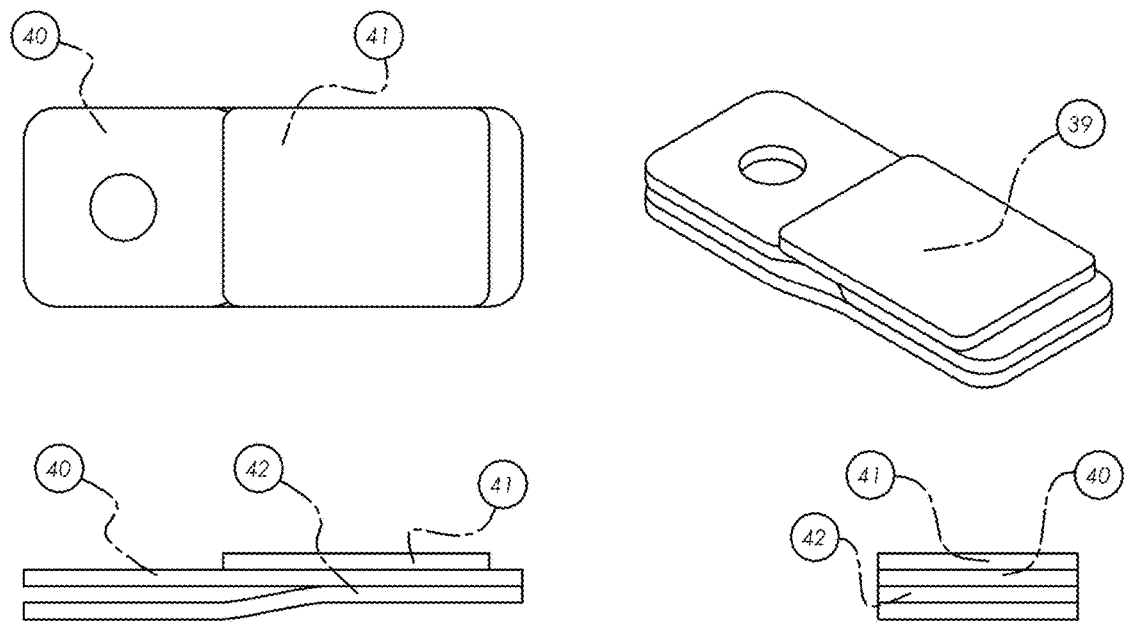
FIG. 12 shows exemplary perspective, top, front, and side views of the load cell unit.
Figure 13:
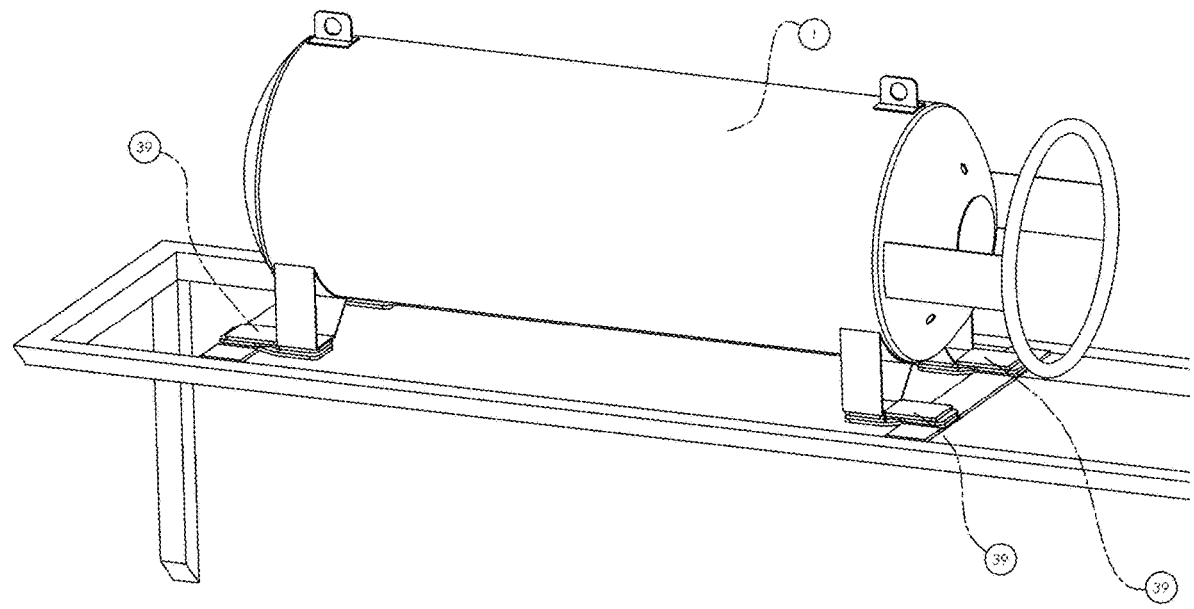
FIG. 13 shows an exemplary perspective view of a cryogenic tank support system utilizing load cell units.

Now referring to FIGS. 12-13, a load cell unit 39 are comprised of the load cell 40, upper guard 41, and lower guard 42. The force on the load cell 40 can be determined by how much the load cell 40 deflects. The upper guard 41 prevents the load cell 40 from deflecting upward while the lower guard 42 prevents the load cell 40 from deflecting downward past the maximum flex limit of the load cell 40.

One or more load cell units 39 support the full weight of the cryogenic tanks 1, with the full weight of the cryogenic tanks being supported by the cantilevers formed by the load cells 40. During high-shock landings, high-shock take-offs, and turbulent flight of aircraft, the upper guard 41 and lower guard 42 prevent the load cell 40 from deflecting outside operational limits.

Figure 14:
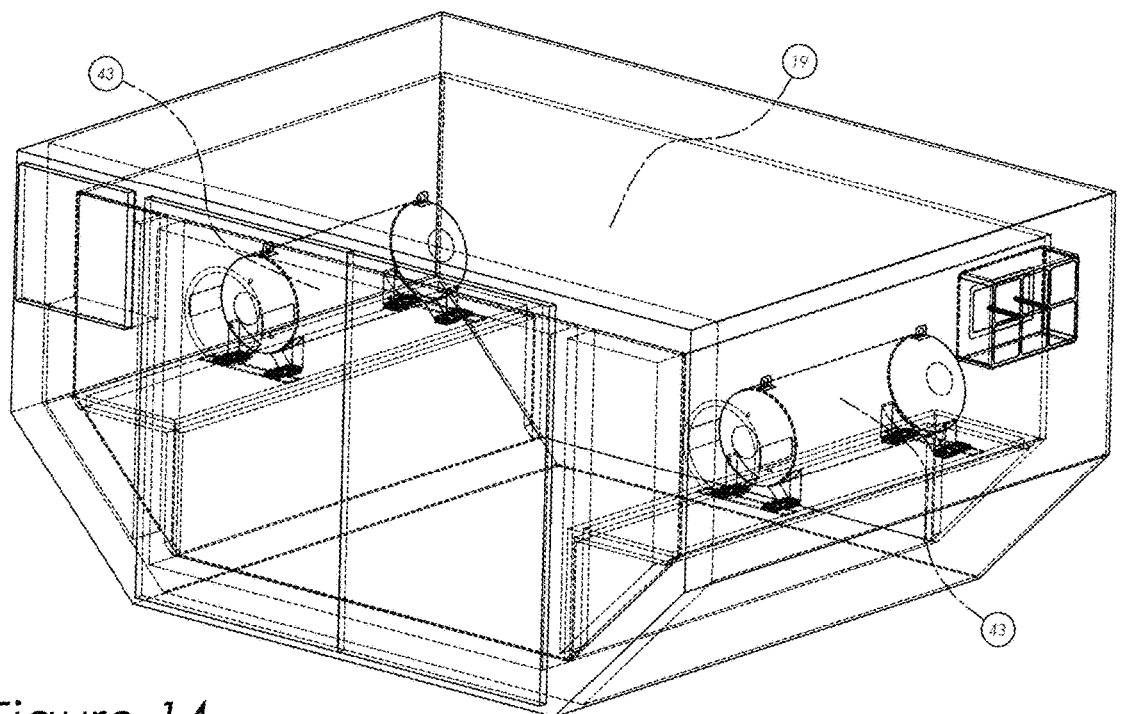
FIG. 14 shows an exemplary perspective view of the horizontal configuration of the LN2 tanks within the ULD.
Figure 15:
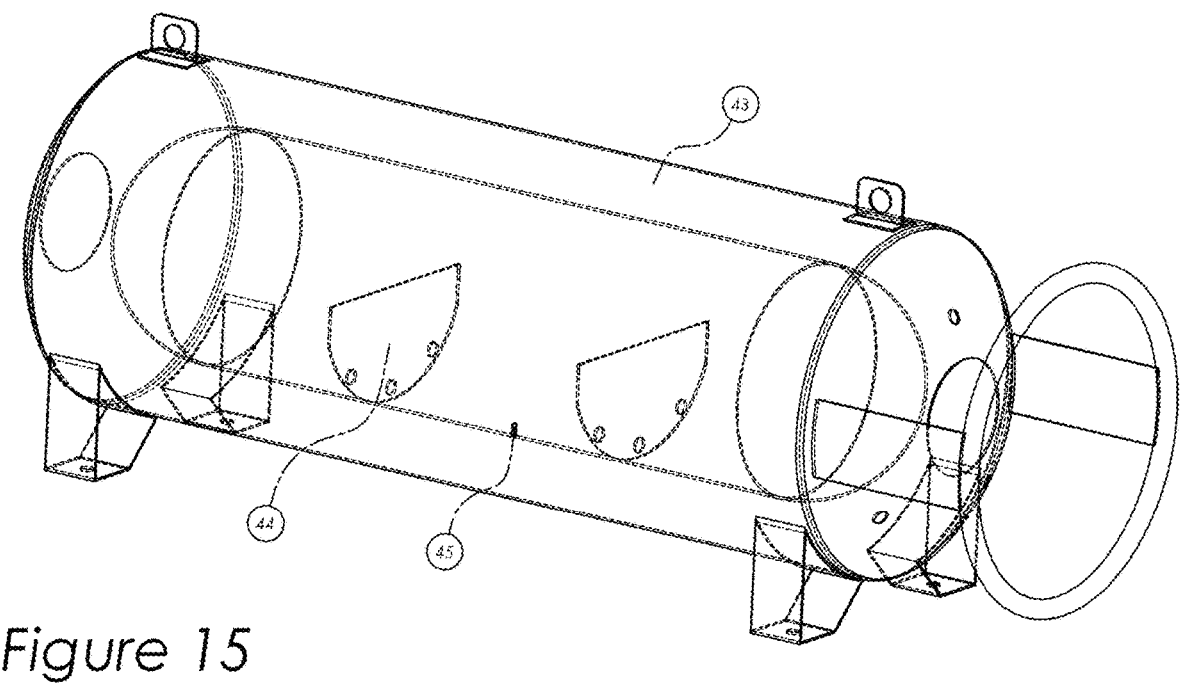
FIG. 15 shows an exemplary perspective view of the LN2 tanks with baffles.
Figure 16:
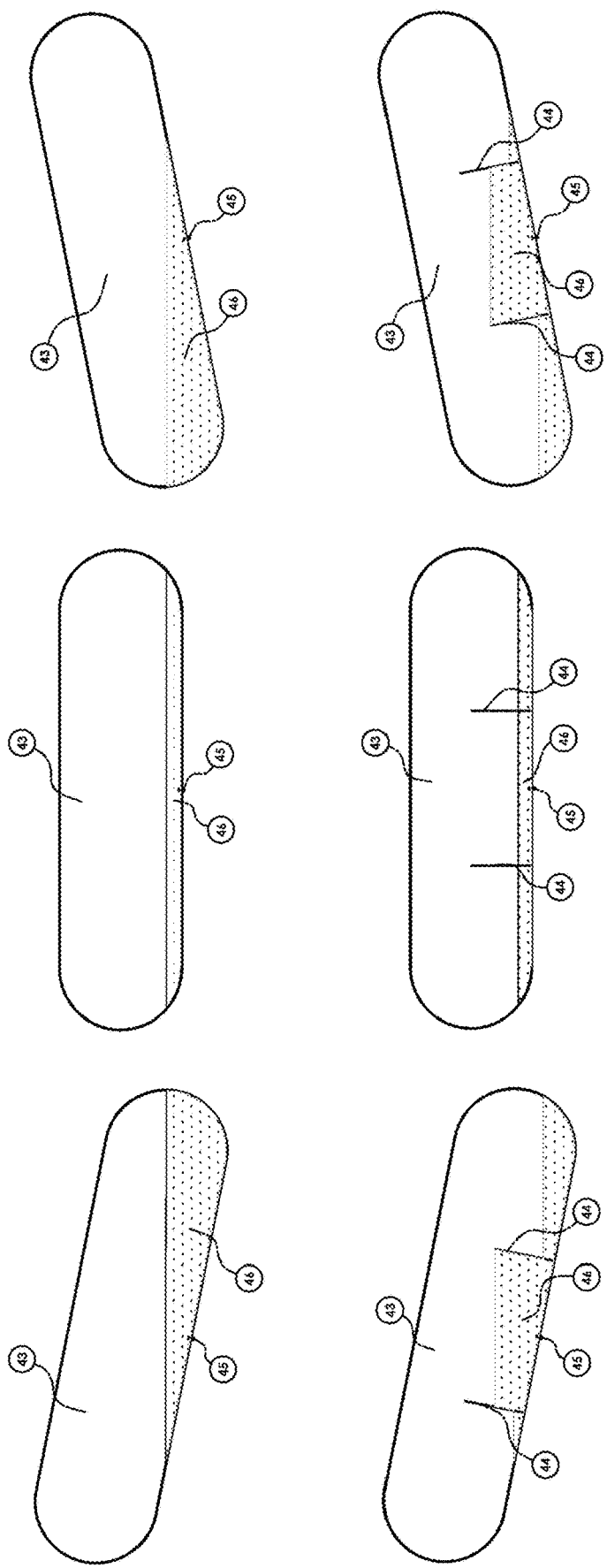
FIG. 16 shows exemplary positions of LN2 tanks with liquid nitrogen within them both with and without baffles.

Now referring to FIGS. 14-16, one or more LN2 tanks 43 are placed horizontally within the ULD. The geometrical configuration of the ULD restricts the one or more LN2 tanks 43 from being oriented vertically within the payload bay 19 of the ULD.

One or more baffles 44 are placed within the LN2 tanks 43. The baffles 44 are positioned so that they partially block liquid flow during periods of acceleration, ensuring that the LN2 outlet 45 is always sufficiently covered, enabling the LN2 tanks 43 to provide a steady and continuous supply of liquid nitrogen 46.

The LN2 tanks 43, should they not have baffles, when tilted left or right will be at more risk to move the liquid nitrogen 46 in such a way as to expose the LN2 outlet 45 to gaseous liquid nitrogen. LN2 tanks 43, with baffles, shield the LN2 outlet 45 more efficiently from gaseous liquid nitrogen during periods of abrupt changes of motion.

Figure 17:
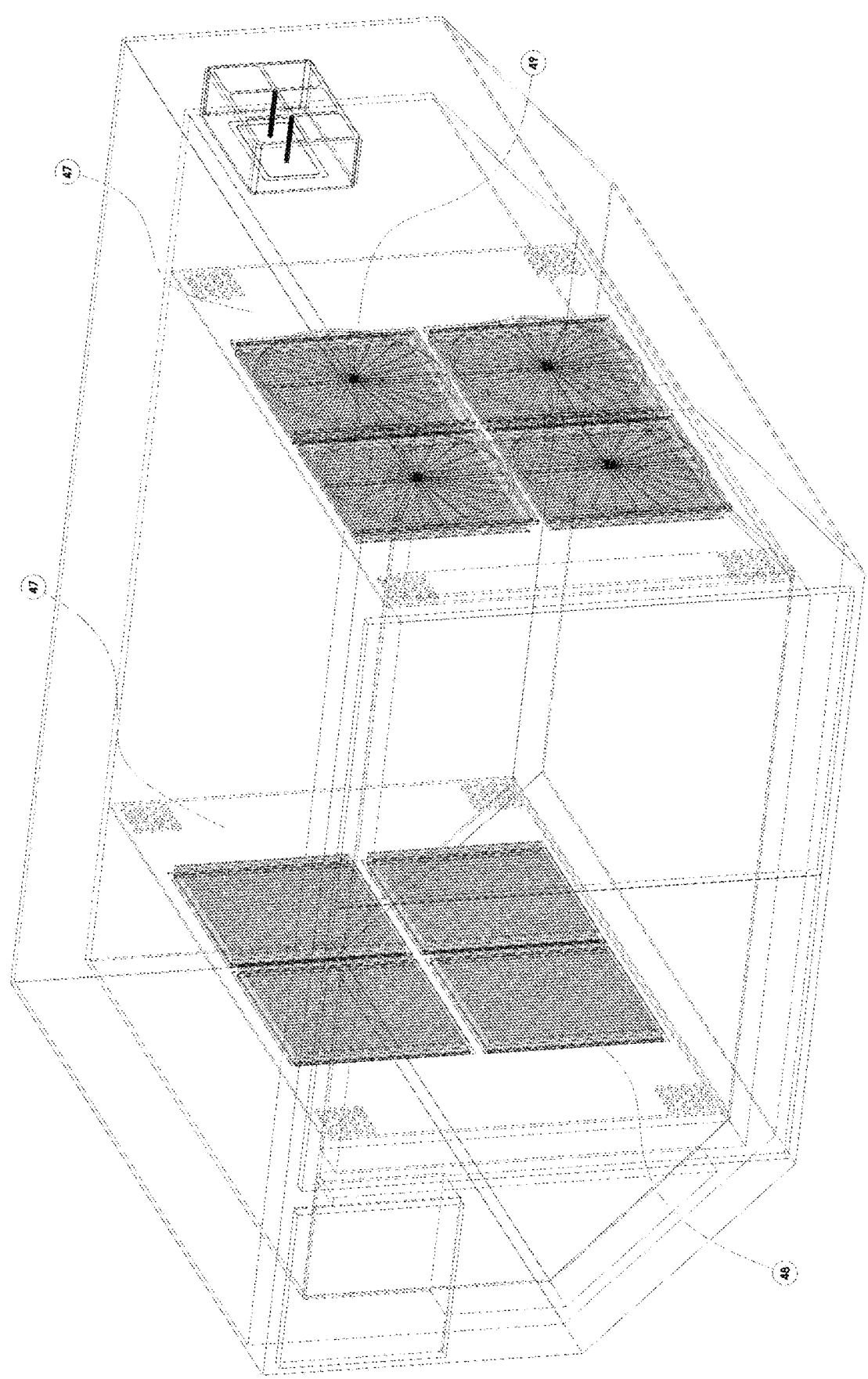
FIG. 17 shows an exemplary perspective view of the ULD with heat exchanger assemblies within.

Now referring to FIG. 17, one or more heat exchanger panels 47 are placed within the payload bay 19. One or more large heat exchangers 48 are placed on the one or more heat exchanger panels 47. The one or more large heat exchangers 48 have a large surface area, causing increased conduction. One or more large fans 49 are placed behind the large heat exchangers 48 and create air flow across the large surface area of the large heat exchangers 48. The air flow across the large surface area of the large heat exchangers 48 causes increased cooling of the payload bay 19.

Figure 18:
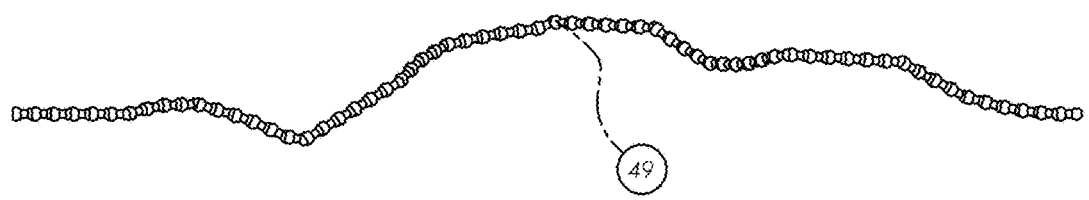
FIG. 18 shows an exemplary perspective view of a flex hose used throughout the cooling system.

Now referring to FIG. 18, one or more flex hoses 49 are used throughout the cooling system to connect the LN2 tanks 43 with the large heat exchangers 48.

Figure 19:
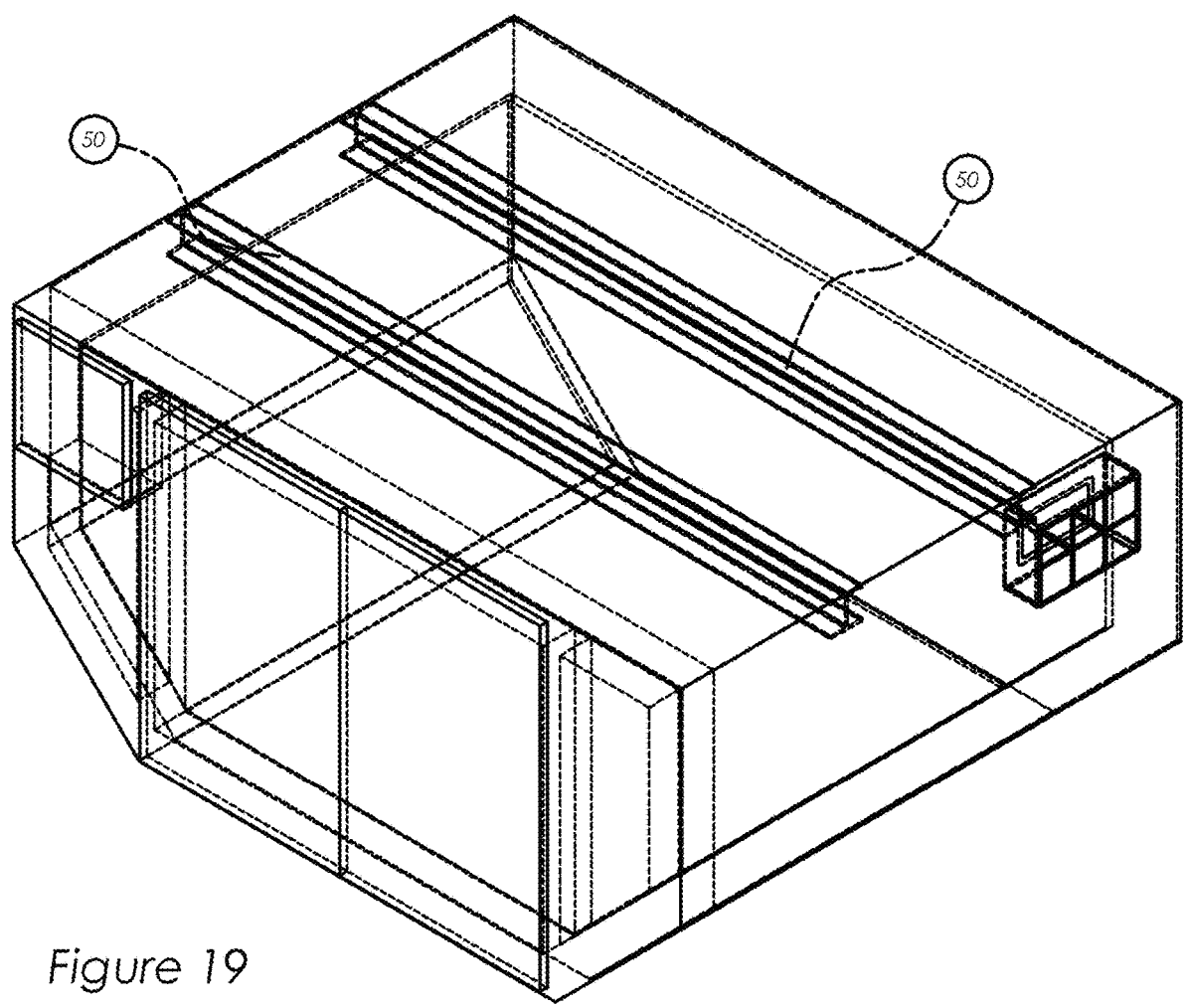
FIG. 19 shows an exemplary perspective view of ULD with the fiberglass thermal break beams.

Now referring to FIG. 19, one or more fiberglass beams 50 are used as structural support for the ULD. The one or more fiberglass beams 50 are made of fiberglass, which is a much lighter weight than steel or similar materials, which is an important factor for aircraft transportation. The one or more fiberglass beams 50 also act as thermal breaks, allowing for better insulating properties than those of steel or similar materials.

Figure 20:
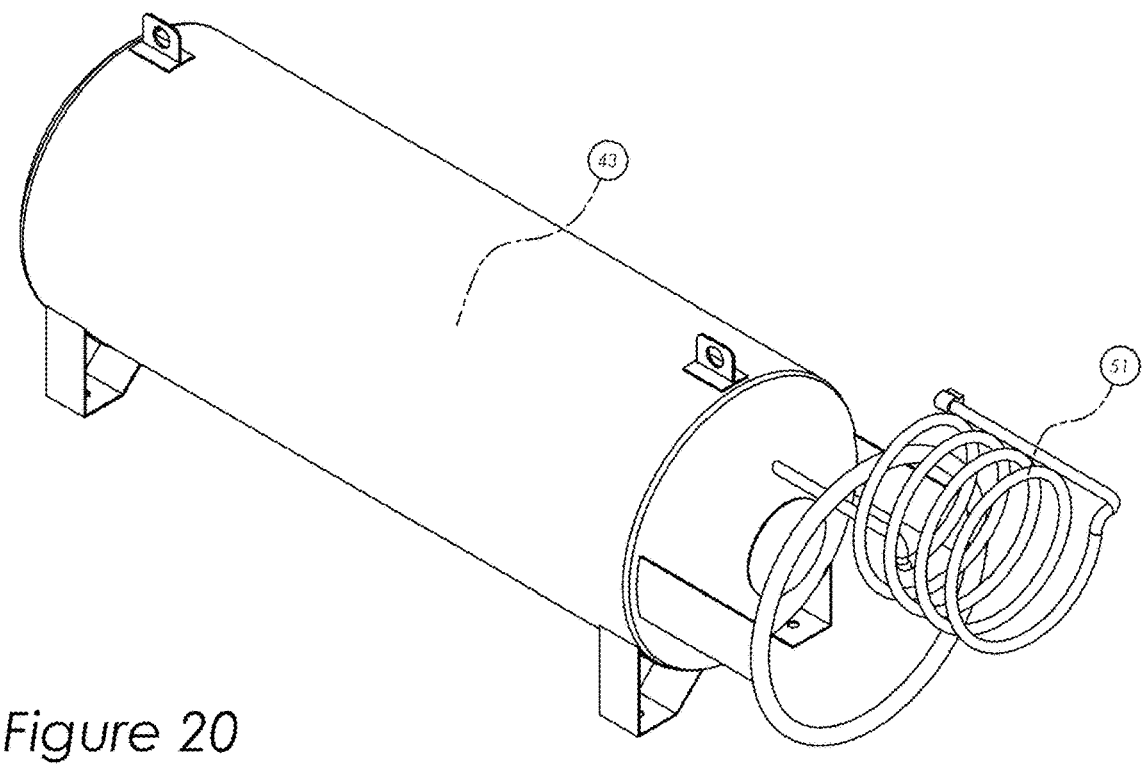
FIG. 20 shows an exemplary perspective view of an LN2 tank with a safety valve assembly whose copper tubing does not include fins.
Figure 21:
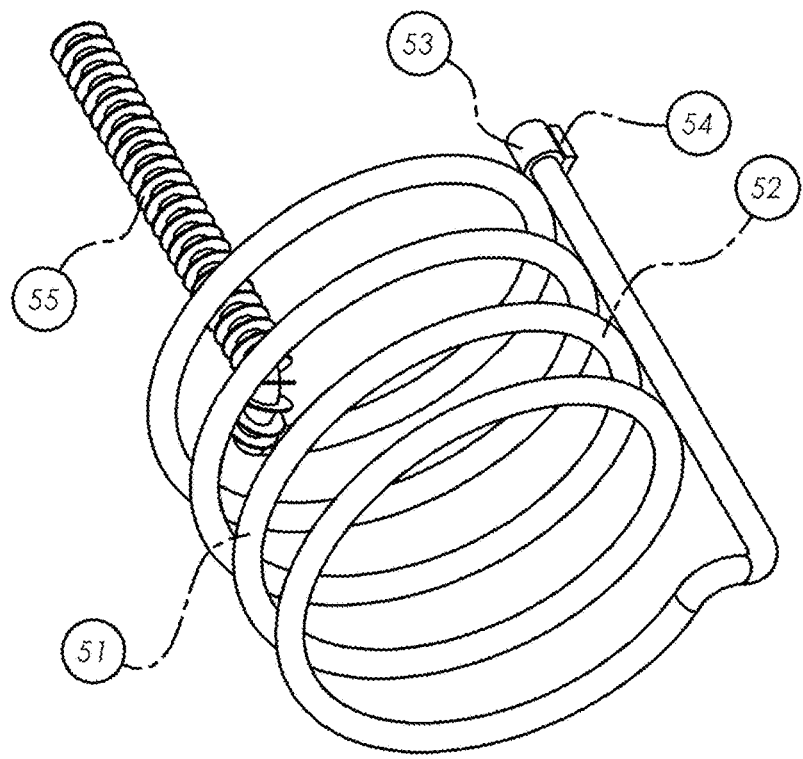
FIG. 21 shows an exemplary perspective view of a safety valve assembly whose copper tubing includes fins.

Now referring to FIGS. 20-21, one or more safety valve assemblies 51 is connected to the one or more LN2 tanks 43 in such a way as to allow the nitrogen within the one or more LN2 tanks 43 to exit once the pressure within the one or more LN2 tanks 43 reaches a critical point. The one or more safety valve assemblies 51 are made up of copper tubing 52, a safety valve 53, and a heating element 54. The copper tubing 52 provides more distance for the nitrogen to travel from the one or more LN2 tanks 43 to the safety valve 53. This distance enables the nitrogen to cool off prior to reaching the safety valve 53 and reduce freezing effects. The heating element 54 is placed near the critical components of the safety valve 53 so that the heating element 54 warms up the safety valve 53 in such a way as to prevent freezing effects. The copper tubing 52 can also include one or more fins 55 to increase the rate at which the nitrogen cools within the copper tubing 52.

Figure 22:
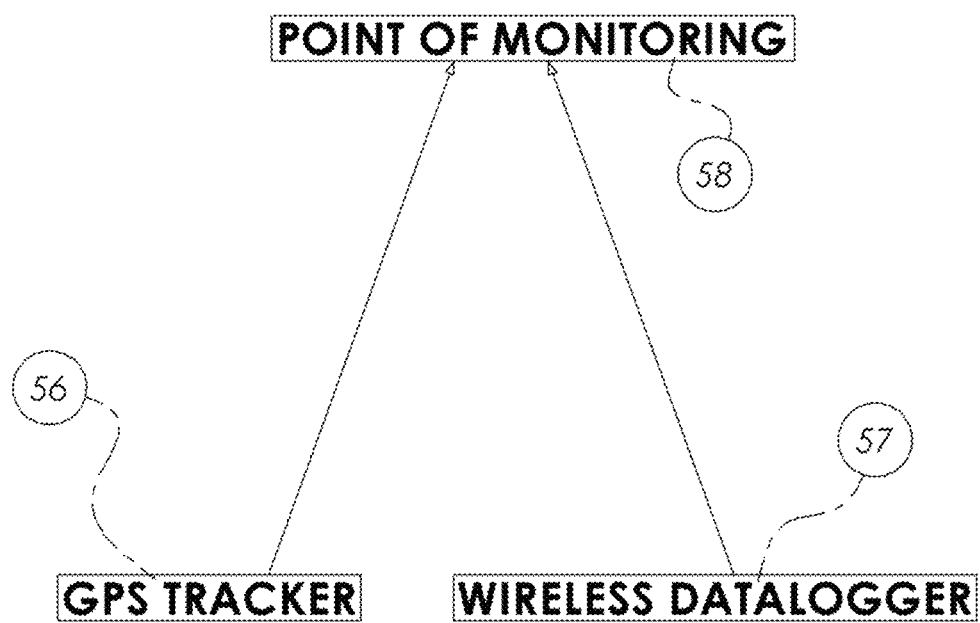
FIG. 22 shows an exemplary transmitted communication between the GPS tracker, the wireless datalogger, and a point of monitoring.

Now referring to FIG. 22, the ULD is equipped with a GPS tracker 56 and a wireless datalogger 57. Both the GPS tracker 56 and the wireless datalogger 57 communicate with a point of monitoring 58 which is where the ULD can be remotely tracked an monitored in order to ensure quality transportation of valuable biomedical substances.

Heat gains are minimized in the cryogenic plumbing by using stainless steel sheet metal surrounding the cryogenic piping that is vacuum sealed. These assemblies are referred to as Vacuum Jacketed Piping. Fittings for input and output connection in the assembly are configured and welded or bayoneted with cryogenic connectors in place. Preferably, the connection between the Vacuum Jacketed Piping is done with a bayonet connector that uses thermal contraction/expansion mechanisms. The contraction/expansion provides a mechanical connection for sections of Vacuum Jacketed Piping with a low heat gain connection. The bayonets are constructed of stainless steel with the nosepiece of the male bayonet being made from a dissimilar material such as the polymer INVAR36 to prevent mechanical seizing. A secondary o-ring seal is used at the flange of each bayonet half to provide a seal in which a gas trap is formed between the close tolerance fitting sections of the bayonet assembly. This gas trap is formed using the initial cryogen flow which is vaporized and forms a high pressure impedance for the lower pressure liquid, thus forming a frost free connection with lowered heat gain to the cryogenic flow.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An air freight unit load device (ULD) for an aircraft with a cargo bay, comprising:
    an enclosure adapted to be placed in the cargo bay with one or more cryogenic tanks;
    a heat exchanger coupled to the one or more cryogenic tanks;
    a Stirling engine having a cold sink coupled to the one or more cryogenic tanks;
    a payload bay with double walls and Vacuum Insulated Panels (VIPs) placed between the walls and thermally isolated from the cargo bay;
    one or more valves coupling the one or more cryogenic tanks, the heat exchanger, and the Stirling engine;
    a controller coupled to the valves and one or more sensors to maintain temperature of the payload bay at a predetermined temperature setpoint, and
    a blowout panel attached to a side of the enclosure applying constant pressure on the blowout panel and sealing the payload bay during normal aircraft operation,
    wherein the enclosure includes at least one angled side housing the one or more cryogenic tanks with load cell units below the liquid nitrogen tanks and the liquid nitrogen tanks positioned horizontally in the ULD, and wherein the enclosure fits predetermined dimensions in the cargo bay.

2. The device of claim 1, wherein the cryogenic tanks store liquid nitrogen to cool or heat the payload bay and the controller maintains the predetermined temperature setpoint to within +/−2 deg C. in the payload bay with temperate between −40 and 50 deg C.

3. The device of claim 1, comprising an electric heating element powered by deep cycle batteries, wherein the deep cycle batteries are charged by the Stirling engine or a gas turbine generator.

4. The device of claim 1, comprising:
baffles in the liquid nitrogen tanks, wherein the baffles provide continuous flow during take offs and landings,
safety valve assemblies designed to prevent the valves from failing in an open condition,
fans and heat exchangers for fast cooling prior to take offs,
a global communication transmitter to track products,
flex hoses to handle high shock landings and in-flight vibrations, and
fiberglass thermal breaks that provide stiffening and lighter weight than steel beams for airline payload weight considerations.

5. The device of claim 1 wherein operational data is recorded and stored in a data recorder and transmitter that communicates with a remote receiver to monitor operational data.

6. The device of claim 1, comprising a GPS tracker and a wireless datalogger that communicates with a point of monitoring.

7. The device of claim 1, wherein the cryogenic tanks are removable from the ULD prior to flight.

8. The device of claim 1, wherein the blow out panel consists of a frame, sliding panel, and one or more springs and acts as an emergency pressure equalizer.

9. The device of claim 1, comprising a load cell with an upper guard and a lower guard to prevent the load cell from deflecting outside operational limits.

10. The device of claim 9, wherein the upper guard and the lower guard prevent the load cell from moving beyond operational limits.

11. The device of claim 1, comprising baffles that retain more liquid nitrogen near a liquid nitrogen outlet during periods of changing acceleration.

12. The device of claim 1, comprising an extended length of copper tubing and a heating element placed on a safety valve to prevent freezing.

13. A method for transporting products with an airplane, comprising:
controlling temperature in a payload bay using cryogenic coolant and a heat exchanger;
recycling exhaust from the heat exchanger to power a Stirling engine;
charging a storage device with power from the Stirling engine;
maximizing a rectilinear storage volume using one or more modular, stackable modules adapted to fit in a fuselage, wherein each module includes at least one angled side housing one or more cryogenic tanks and wherein each module fits predetermined dimensions in the fuselage; and
venting exhaust gas to an exterior of the airplane.

14. The method of claim 13, comprising isolating the payload bay with double walls and Vacuum Insulated Panels between the walls.

15. The method of claim 13, wherein operational data is recorded and stored in a data recorder and transmitter that communicates with a remote receiver to monitor operational data.

16. The method of claim 13, comprising vertically stacking two enclosures with common ends facing each other and opposite ends facing a fuselage exterior.

17. The method of claim 13, comprising equalizing pressure using a blow-out panel with a frame, sliding panel, and one or more springs and further comprising providing emergency pressure equalization.

18. The method of claim 13, comprising a load cell with an upper guard, and a lower guard.

19. The method of claim 13, comprising horizontally placing two enclosures where common ends face each other and opposite ends face a fuselage exterior.

20. The method of claim 13, comprising performing fast cooling prior to take-off using one or more fans and the heat exchanger.

* * * * *